Sept. 14, 1954     W. F. ROLLMAN     2,689,267
POLYMERIZATION OF OLEFINS EMPLOYING GRANULAR CATALYST
Filed March 31, 1951     3 Sheets-Sheet 2

Walter F. Rollman    Inventor

By P. L. Young   Attorney

Patented Sept. 14, 1954

2,689,267

UNITED STATES PATENT OFFICE 2,689,267

POLYMERIZATION OF OLEFINS EMPLOYING GRANULAR CATALYST

Walter F. Rollman, Cranford, N. J., assignor to Standard Oil Development Company, a corporation of Delaware Application March 31, 1951, Serial No. 218,633

9 Claims. (Cl. 260—683.15)

The present invention relates to an improved process and apparatus for polymerizing olefins. It relates more particularly to a process and apparatus in which olefins are polymerized in the presence of a bed of solid, granular polymerization catalyst under conditions of temperature and pressure wherein the fluid contents in the reaction zone are maintained in a substantially non-gaseous phase. A particular feature of the present invention is that of recycling internally a substantial portion of the effluent from the catalyst bed in admixture with the olefin feed through the catalyst.

It is known in the prior art to polymerize olefins using a solid granular catalyst, such as, supported phosphoric acid, in the form of a fixed bed. Since the polymerization reaction is highly exothermic, difficulty is experienced in controlling reaction zone temperatures. Frequently, hot spot conditions occur in the catalyst bed adversely affecting catalyst activity and life. This difficulty is particularly noticeable when the reaction is carried out at high pressures, under which conditions high reaction rates and the high density of the olefin charge stock make temperature control difficult. In order to make such a process commercially feasible, reaction zones of the tubular type, steam jacketed reactors, or banks of heat exchangers with catalyst inside of the tubes, are generally employed. The individual catalyst chambers are commonly in the form of elongated tubes having length to diameter ratios in the order of 25:1 to as high as 150:1 with a maximum of several inches distance being maintained from the cooling surface to the central portion of the catalyst bed. The temperature gradient between the top and bottom of each bed is high, leading to non-uniformity of reaction. Tubes of this type are difficult to clean and charge with fresh catalyst. They require external cooling means and are comparatively expensive to construct. In order to avoid localized cooling effects and to maintain suitable temperatures in the reaction zone, the olefin feed is generally preheated to substantially the reaction temperature and usually contains appreciable quantities of non-olefinic diluents.

An advantageous alternate method of polymerizing olefins is that of agitating a stock containing in addition to the olefins a finely divided, suspended catalyst. The reactants and polymerized products, together with the suspended catalyst, are internally recycled, in the reaction zone, in order to maintain uniform temperatures and uniform fluid composition. This so-called suspension or slurry type of operation overcomes certain disadvantages of a fixed-bed type of operation. However, the finely divided catalyst tends to agglomerate, and entrainment difficulties are encountered when using severe agitation which is usually required to maintain the catalyst in a suspended state. Attempts have been made to overcome this difficulty by employing special types of equipment or solid, finely divided diluents for the catalyst.

It is, therefore, a primary object of the present invention to carry out the catalytic polymerization of olefins using a solid, granular catalyst in a fixed bed process in which the advantages of both the conventional fixed-bed and slurry-type operations are realized and the disadvantages of these two types of operation are minimized.

It is a further object of the invention to conduct a fixed bed catalytic polymerization in which the need of external cooling of the reaction zone to balance the exothermic heat of reaction is minimized or eliminated.

Another object is that of conducting olefin polymerization in which the olefin feed is charged to the reaction zone at relatively low temperatures. This minimizes the need for preheating the feed stock, the feed being raised to substantially reaction temperature by absorbing exothermic heat of reaction; internal circulation of reaction zone effluent in admixture with the feed is employed to achieve efficient heat exchange and uniform operating conditions.

Another object is to maintain the entire reaction zone near the optimum polymerization temperature.

Another object is that of employing in the reaction zone a catalyst bed having a relatively low length to diameter ratio thus simplifying the construction and maintenance of the equipment, and facilitating the minimization of temperature gradient across the bed.

An additional object is to carry out a fixed bed operation in which feed stocks, having higher olefin concentrations than those conventionally used, may be employed to achieve high reaction rates and reduce reactor volume per a given charge rate.

It is another object of the invention to disclose a process in which the reactants and products are maintained in a substantially non-gaseous state, such as a liquid phase or in a highly dense phase at above critical pressures, in conjunction with internal circulation of effluent from the catalyst zone back through the catalyst zone. The internal recirculation is thus facilitated, with a consequent improvement in temperature control and increased capacity of a given catalyst bed.

It is also an object of the present invention to disclose an apparatus wherein the above objects may be achieved by internal recycling of catalyst bed effluent employing a mechanical impelling means to effect recycling.

The invention may be more readily understood by reference to the attached drawings illustrating various embodiments thereof in which.

Figure 1:
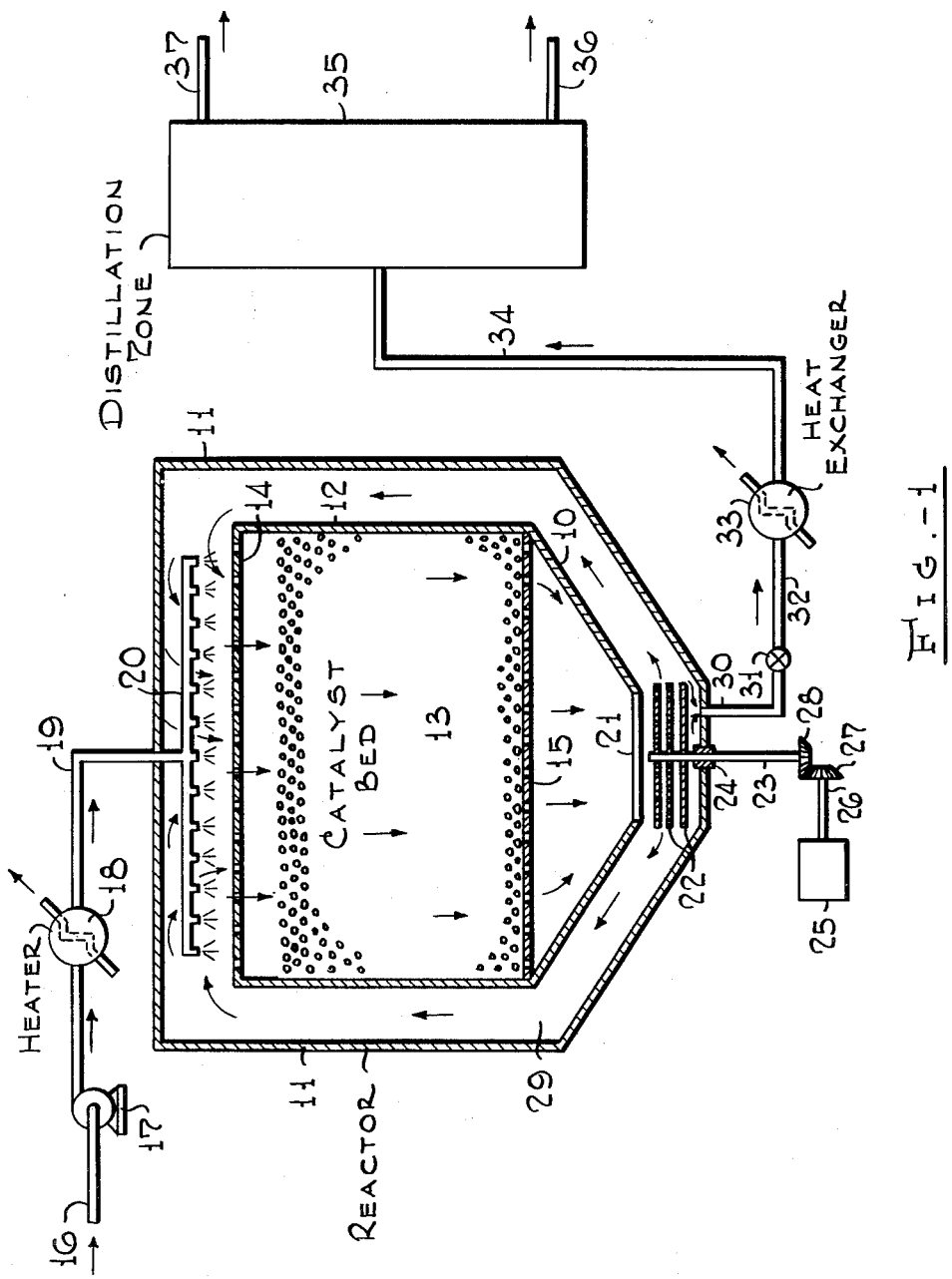
Figure 1 illustrates a fixed bed reaction zone and attendant equipment, partly in vertical section, employed in carrying out the present process.

Turning now to Figure 1, numeral 11 designates a non-cooled reactor housing that may if desired be insulated and in which is disposed a catalyst chamber 12 filled with bed 13 of solid, granular polymerization catalyst. Chamber 12 includes an inlet 14 such as a perforated top or the like having a plurality of holes through which fresh feed and circulating medium may be introduced into the catalyst. The catalyst bed support 15 is also perforated. Bottom 10 of chamber 12 may be coniform and includes circular outlet 21. The length to mean diameter ratio of the catalyst bed is relatively low for reasons that will become obvious in the subsequent discussion.

A fresh feed stock comprising olefins, such as normally gaseous olefins, is compressed to an elevated pressure, substantially that to be maintained in reaction zone 11, and is passed by line 16 and pumping means 17 through heat adjustor 18. Heat adjustor 18, which may be conventional heat exchanger, will not be required if the olefin content of the feed stock is such that the sensible heat of the feed from atmospheric temperature up to the desired reaction temperature equals the heat of reaction. Generally, however, with typical feeds containing on the order of 50% olefin, preheating to a temperature at least 150° F. below the reaction temperature, and in the range of 50° to 300° F., will be necessary to obtain precise heat balance in the reactor.

The pressured feed stock is then passed by line 19 to distributing means 20 in the reaction zone and above the catalyst bed inlet. Distributing means 20 may comprise a pipe spider, for example. Reactants are continuously passed through catalyst bed 13 and are withdrawn through outlet 21, adjacent which is positioned a radial flow impelling means 22, such as a multiple disk or turbine type impeller rigidly affixed to rotatable shaft 23, passing through packed bearing means 24 in housing 11. The impelling means is powered by prime mover 25 having shaft 26 and rigidly affixed gear 27 meshing with gear 28 on shaft 23.

Catalyst bed effluent comprising polymerized olefins and unpolymerized feed passes through outlet 21 and is impelled outwardly by disks 22 operating at a high rotational speed. The effluent is thus circulated without substantial temperature change through annular passageway 29, defined by the catalyst chamber and reaction zone housing, in the direction of the arrows to inlet 14 of the catalyst bed. The fluid effluent is thoroughly mixed with the injected fresh feed which heats the feed up to substantially the reaction temperature. The mixture is passed through the catalyst bed 13 wherein it is heated up to equilibrium reaction temperature by the exothermic heat evolved during the polymerization reaction. As a consequence of the relatively large heat capacity of the recycled material, temperature gradient through the bed is small.

A portion of the catalyst bed effluent is continuously withdrawn from the reaction zone by lines 30 and 32, the rate of withdrawal being controlled by valve 31. The effluent may be depressured if desired and charged through heat exchange means 33 where the temperature is adjusted prior to charging it through line 34 into distillation means 35. At this point the effluent is distilled for the separation of polymer products boiling in the gasoline boiling range and unpolymerized constituents, the former being withdrawn through line 36 and the latter through line 37. The unpolymerized material may, if desired, be repressured and recycled back to line 16. Under such circumstances it may be necessary to concentrate the olefin by rerunning prior to recycling. Generally, instead of recycling in this manner it is preferable to use two or more polymerization reactors in series to achieve complete clean up.

The use of an axial flow type impeller, adjacent the outlet of the catalyst bed, is not satisfactory in this modification for obtaining forced circulation of the effluent through the annular space back to the inlet of the bed. A radial flow impelling means should have an area substantially that of the catalyst bed outlet and also should substantially completely fill the space between the outlet and the bottom portion of the reaction zone in order to minimize short circuiting of the fluid contents at this point.

The temperature and pressure maintained in the reaction zone will be sufficiently high to obtain the desired conversion of olefins to polymers, and to maintain the fluid contents of the reaction zone in a substantially non-gaseous phase. The latter is an important feature of the invention. Gaseous material could not be recirculated as satisfactorily as liquid by impelling means necessary to overcome pressure drop through the catalyst bed. Hence gaseous phase or mixed phase operation would not permit recirculating sufficient material to heat the cold fresh feed to reaction temperature and minimize temperature gradient through the bed. The capacity of the reaction zone would be considerably lower in gaseous or mixed phase than in non-gaseous phase operation. In addition, catalyst activity will be maintained at high level by washing the heavy polymer from the catalyst with non-gaseous fluid; gaseous fluids will not accomplish this.

The catalyst bed effluent is recycled back to the catalyst bed inlet without substantial diminution of temperature before it comes into contact with relatively cool fresh feed. The amount of effluent recycled based on the effluent withdrawn from the reaction zone will depend on such factors as fresh feed charge rate and temperature, length to mean diameter ratio of the catalyst bed, extent of olefin conversion, and uniformity of reaction temperature. The catalyst bed should have a relatively low length to mean diameter ratio, in the order of 0.2:1 to 10:1, for several reasons. If the ratio is too high, pressure drop through the bed will be difficult to overcome by simple internal impelling means ordinarily available, and recirculation will be limited thereby. When the ratio is low, a high rate of recirculation is easily achieved and temperature gradient across the bed is correspondingly minimized.

Figure 2:
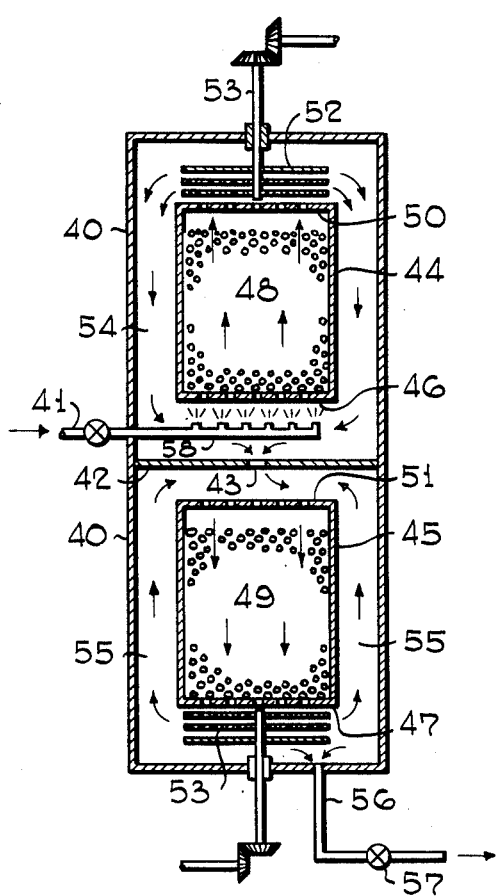
Figure 2 illustrates a 2-stage reaction zone, partly in vertical section, employing internal circulation in both zones.

Referring to Figure 2, the reactor includes reactor housing 40 separated by partition 42 including orifice 43. Partition 42 may be any suitable baffling means that will restrict the passage of fluid from one part of zone 40 to another part. Catalyst chambers 44 and 45 are disposed in the upper and lower portions of the reaction zone and have perforated bottoms 46 and 47, respectively, for supporting catalyst beds 48 and 49, respectively. Chambers 44 and 45 include perforated tops 50 and 51. Impelling means 52 is rotatably positioned adjacent outlet 50 and is powered by a prime mover through shaft 53 in a manner similar to that described in connection with the apparatus of Figure 1. Outlet 47 likewise has adjacent it an impeller 53 rotatably positioned adjacent to and below the outlet.

Passageways 54 and 55 fluidly connect the inlet and outlet of each catalyst bed and are fluidly connected with each other through orifice 43. Olefin feed at high pressure and relatively low temperature is introduced by line 41 into pipe spider 58 where it is admixed with recycled catalyst bed effluent passing through perforated bottom 46. It is impelled by impelling means 52 through passageway 54 to inlet 43 and is continuously recycled through catalyst bed 48.

A portion of the recycled mixture is continuously withdrawn from passage 54 through orifice 43 into passage 55 where it likewise is thoroughly mixed with recycled effluent leaving outlet 47 of bed 48. The mixture is continuously passed through bed 49 and recycled in the manner described above. A portion of the effluent from bed 49 is continuously withdrawn by means of line 56 containing valve 57 and is charged to recovering means not shown.

By employing the two fluidly connected reaction zones operating in series, as shown in Figure 2, it is possible to maintain an olefin gradient in the effluents from the respective catalyst beds, and to operate the zones at somewhat different temperature levels. Most of the polymerization of olefins will occur in the first stage wherein the exothermic heat evolved will be balanced by heat exchange with the cool fresh feed. A portion of the admixed fresh feed and effluent will pass to the second catalyst stage for olefin-cleanup thus permitting high overall conversions to be realized. Since the amount of olefin entering bed 49 is relatively small compared to that entering bed 48, the temperature in the latter bed will be only slightly higher than that in the former bed. The rate of recycling through passage 55 will be determined by the rate of effluent withdrawal through line 56.

As a general rule, the amount of effluent recirculated through passages 54 and 55 will be about 1 to 100 volumes, preferably 5 to 20 volumes, per volume of effluent withdrawn through orifice 43 and line 56, respectively. The precise ratio chosen for a given case will depend on feed temperature, i. e. the sensible heat of recycled material required to raise the feed to reaction temperature, and the desired uniformity of temperature in the reaction zone.

Figure 3:
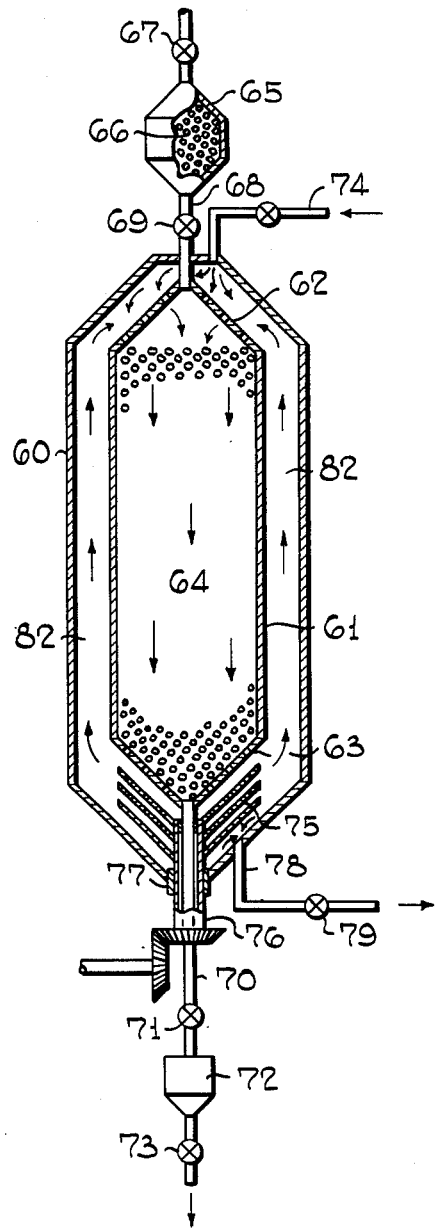
Figure 3 illustrates a modification of Figure 1, partly in vertical section, in which the reaction zone includes means for adding fresh catalyst to and withdrawing spent catalyst from the catalyst bed.

The modification shown in Figure 3 comprises a reaction zone 60 having disposed therein catalyst chamber 61 having perforated, conical top and bottom 62 and 63, respectively. Granulated, solid catalyst 64 is supported as a bed within chamber 61. Hopper 65 contains fresh catalyst 66. Valve 67 is positioned in the inlet to hopper 65, and the hopper is connected through line 68 containing valve 69 to the top of chamber 61. Chamber 61 likewise includes an outlet line 70 containing valve 71 leading to spent catalyst hopper 72 having valve 73 in the outlet.

Fresh feed is introduced through line 74 into annular space 82. A conical type, radial flow impelling means 75 is mounted on hollow shaft 76 rotated by prime mover not shown. Shaft 76 is concentrically positioned over line 70 and is rotatable in bearing 77 at the bottom of housing 60. Effluent is withdrawn from the reactor through line 78 containing valve 79.

In this embodiment, fresh catalyst may be continuously or intermittently added to bed 64 by adjusting valve 69, and spent catalyst may be withdrawn through line 70 by controlling valve 71. Hydrocarbon withdrawn with the catalyst into hopper 72 is drained and stripped therefrom by conventional means (not shown) and ultimately is combined with the effluent withdrawn through line 78.

Although as a general rule in most fixed bed operations, the uppermost catalyst in the catalyst bed tends to become contaminated with carbonaceous deposits prior to that at the lower levels, a particular advantage in the present invention derives from the fact that the reactants are maintained in a homogeneous phase by internal circulation of reactants and products. This circulation permits all portions of the catalyst bed to be contacted by a fluid of substantially constant composition, and, hence, all portions of the catalyst will tend to become deactivated at a substantially constant rate. For this reason it is feasible to withdraw catalyst from the bottom of the reactor, as shown in Figure 3, and add new catalyst at the top. On the other hand, if desired, impelling means 75 may be placed adjacent the top of chamber 61. Effluent could be withdrawn at that point and fresh feed injected near perforated bottom 63, thus making bottom 63 the inlet to the catalyst bed. In this modification, fresh catalyst from hopper 65 is added to the portion of the catalyst zone at which effluent is withdrawn and spent catalyst withdrawn through the line leading from the inlet of bed 64.

Figure 4:
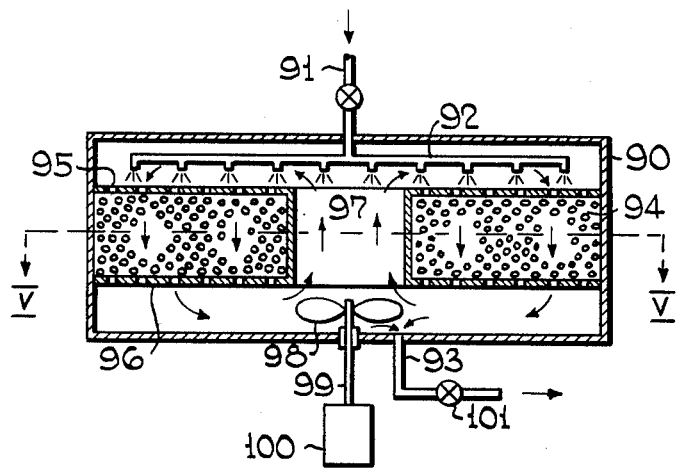
Figure 4 shows partly in vertical section, another embodiment of a reactor to be used in the present invention.
Figure 5:
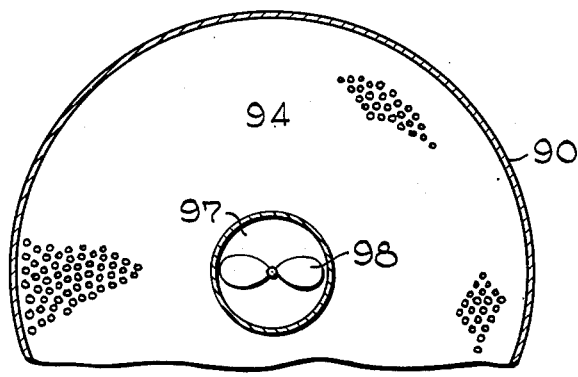
Figure 5 is a plan view of Figure 4 taken along the line V—V.

Referring to Figures 4 and 5, a reactor is shown in which effluent from the catalyst bed is recycled through an opening in the center of the bed fluidly connecting the inlet and outlet thereof. Reaction chamber 90 includes feed inlet 91 having distributing pipe spider 92 and has an effluent outlet 93. Catalyst bed 94 is disposed within the reaction zone and has a perforated top inlet 95 and a perforated bottom outlet 96. Circular opening 97 extends through the central portion of the bed. An axial impeller 98, such as a propeller, is disposed in the bottom portion of the reaction zone below opening 97. The area defined by rotating impeller 98 is substantially the same as the area of the opening 97. Impeller 98 is rigidly affixed to shaft 99 extending through the bottom of reactor 90, the shaft being rotated by prime mover 100.

In this type of reactor, effluent withdrawn from the catalyst bed 94 is continuously impelled upwardly through opening 97 where it comes into contact with relatively cool, olefin-containing feed introduced through the distributing means. The material is thoroughly admixed and is forced through opening 95 and thence through the catalyst bed. A portion of the effluent is continuously withdrawn through line 93, the amount, determined by feed rate, being controlled by adjusting valve 101.

In a specific example of the present invention, a normally gaseous feed stock comprising chiefly $C_3$ hydrocarbons with very little other hydrocarbons and containing about 55% propylene is compressed up to about 1000 p. s. i. g. and charged into a reaction zone at about 230° F. A catalyst chamber disposed within the reaction zone and containing 2 to 10 mesh granules comprising about 80% phosphoric acid deposited on 20% kieselguhr has a length to diameter ratio of about 1:1. Fresh feed is charged at a rate of 0.2 gallon per pound of catalyst per hour (37 liq. vol./cat. vol./hr.). The fresh feed admixed with recycled effluent from the catalyst chamber is passed through the catalyst chamber and continuously the effluent therefrom is impelled through a passageway within the reaction zone, which fluidly connects the catalyst bed inlet and outlet, back to the inlet. The non-gaseous fluid within the entire reaction zone is maintained at a temperature near 450° F. by recycling 10 volumes of catalyst effluent per volume of material withdrawn from the reaction zone when operating at a conversion of about 90% of the olefins to produce higher boiling dimers, trimers and tetramers. By operating in this manner it is possible to eliminate external cooling means for the reaction zone, to eliminate much of the preheating of the fresh feed and to obtain satisfactory heat balance within the reaction zone for long operating periods.

Conversion and capacity may be increased by using two or more reactors in series. In this case, although some temperature difference between reactors will exist, heat exchangers between the reactors will not usually be required.

The feed streams for the polymerization operation will generally contain from about 30 to 50% of olefins, the remainder of the stream suitably being hydrocarbon diluents such as paraffins. One advantage of the process, however, is that streams containing up to 100% olefins may be used, in contrast to conventional fixed bed operations which are limited by heat release consideration to much lower olefin concentrations. Normally gaseous hydrocarbon feed streams are preferred, the olefins in such streams being ethylene, propylene, butylenes, pentylenes, and mixtures thereof.

The granular catalysts used in the present invention include activated alumina, siliceous earths, alumina silicates, thoria, titania, zirconia or other similar substance as a major constituent. Preferably they are of the acid type such as phosphoric acid supported on various adsorbent solids of the siliceous type and usually based on the total catalyst from about 50 to 90% phosphoric acid will be added to the support. Supports for the phosphoric acid include kieselguhr, silica gel, alumina, Porocel, adsorbent carbon and the like. The catalyst granules may have a size in the range of 2 to 25 mesh, but larger sizes such as 2 to 10 mesh are usually preferred.

Polymerization pressures and temperatures are those at which substantial yields of polymers are formed and at which substantially no gaseous phase is present. Therefore, the reaction must be carried out in the substantial absence of non-hydrocarbon, gaseous materials such as hydrogen, nitrogen and the like. Temperatures in the range of about 350 to 600° F. and pressures in the range of 500 to 1500 p. s. i. g. may be used, although pressures preferably are maintained from about 900 to 1200 p. s. i. g. At these high pressures, normally gaseous olefins and polymer products are at above critical pressure under which conditions the high density fluid reactants permit better utilization of reactor space. Fresh feed rates under such conditions will generally range from about 0.1 to 0.5 gallon of liquid feed per pound of catalyst per hour (18 to 93 liq. vol./vol. cat./hr.).

The extent to which catalyst bed effluent is recycled will depend on the level and uniformity of temperature maintained in the reactor, on the temperature and charge rate of the fresh feed and on the olefin conversion to be maintained. Generally, from 1 to 100, preferably 5 to 20, volumes of effluent are recycled per volume of effluent withdrawn from the reaction zone. The extent of internal recycle required decreases in succeeding stages in a multi-stage system.

When employing phosphoric acid type catalysts, it may be necessary to inject continuously or at frequent intervals, small amounts of water into the catalyst bed in order to prevent dehydration of the catalyst. The water may be added by saturating the feed stock with water prior to its introduction to the reaction zone or the water may be pumped directly into the inlet of the catalyst bed. Generally, an amount of water equivalent to from 0.1 to 2.0 gallons of water per 1000 gallons of feed will be required.

What is claimed is:

1. A process for the polymerization of olefins in the presence of a granular polymerization catalyst at a polymerization temperature and pressure which comprises passing the feed stream comprising said olefins at a temperature below said reaction temperature into a reaction zone including a bed of said catalyst, withdrawing an effluent stream comprising polymerized olefins from said bed, recycling a portion of the total effluent stream without substantial change in temperature through said bed in admixture with said feed stream and withdrawing the remainder of said effluent stream from said reaction zone, the reaction temperature and pressure being maintained at a level such that the fluid contents of said zone are in a substantially non-gaseous phase, and the feed stream temperature being such that its sensible heat up to the reaction temperature will substantially equal the heat of reaction.

2. A process for polymerizing olefins at a reaction temperature and pressure in the presence of a granular polymerization catalyst which comprises passing a feed stream including said olefins at a temperature below said reaction temperature into a reaction zone including a bed of said catalyst, passing said stream through said bed whereby at least a portion of the olefins are polymerized, withdrawing an effluent from said bed, recycling a portion of the total effluent at substantially reaction temperature into contact with said stream and passing the admixture thereof through said bed whereby substantially no temperature gradient exists between the inlet and outlet of said bed, and withdrawing a portion of said effluent from said reaction zone, said reaction temperature and pressure being sufficient to maintain the fluid content of said zone in a substantially non-gaseous state, and said feed stream having a temperature such that its sensible heat up to said reaction temperature will substantially balance the exothermic heat evolved in the polymerization reaction.

3. A process in accordance with claim 2 wherein said feed stream is introduced into said zone at a temperature in the range of 50 to 300° F.

4. The process in accordance with claim 2 wherein the ratio of said effluent recycled to said effluent withdrawn is in the range of 1 to 100.

5. The process in accordance with claim 2 in which said reaction temperature is in the range of 350 to 600° F., and said pressure is in the range of 500 to 1500 p. s. i. g.

6. In the process of polymerizing normally gaseous olefins in which a feed stream comprising said olefins is passed through a bed of granular phosphoric acid catalyst at polymerization temperature and pressure, the improvement which comprises introducing said stream at a temperature at least 150° F. below said reaction temperature and at substantially reaction pressure into a reaction zone including said bed, withdrawing from said bed an effluent comprising polymerized olefins, mechanically impelling a portion of the total effluent without substantial temperature change into admixture with said feed stream, passing said mixture through said catalyst bed, and withdrawing the remainder of said effluent from said catalyst zone, said temperature and pressure being sufficiently high to maintain the fluid contents of said zone in a substantially non-gaseous phase, and the temperature of said feed stream being such that the sensible heat of the feed stream up to the reaction temperature will substantially balance heat evolved in the reaction zone.

7. The process in accordance with claim 6 in which the catalyst comprises phosphoric acid impregnated in a solid carrier.

8. In the process of polymerizing olefins in which a feed stream comprising said olefins is passed through a bed of granular polymerization catalyst at elevated temperature and pressure, the improvement which comprises introducing said stream at a temperature substantially below said polymerization temperature into a reaction zone including a first bed of said catalyst wherein most of the olefins are polymerzied, withdrawing from said first bed an effluent comprising polymerized olefins, and some unreacted olefins, recycling at least a portion of the total effluent without substantial temperature change whereby said effluent is admixed with said feed and passed through said bed, continuously withdrawing a portion of said mixture from said first bed and passing same into a second bed of said catalyst maintained at a higher temperature than said first bed, withdrawing an effluent from said second bed, recycling at least a portion of the total effluent from this bed without substantial temperature change whereby said recycled effluent is passed in admixture with said portion of said mixture withdrawn from said first zone through said second bed of catalyst, and continuously withdrawing the remainder of said second-bed effluent from said reaction zone, the temperature and pressure in said zone being sufficiently high to maintain the fluid contents thereof in a substantially non-gaseous phase, and the feed stream having a temperature such that its sensible heat up to the reaction temperature in said first bed will substantially balance exothermic heat evolved from polymerization reactions taking place in said first bed.

9. In the polymerization of olefins in which a feed stream comprising said olefins is passed through a bed of granular polymerization catalyst at a polymerization temperature and pressure whereby exothermic heat of reaction is evolved, the improvement for obtaining heat balance within a reaction zone without resorting to external cooling of the zone which comprises introducing said stream at a temperature below said polymerization temperature and at substantially reaction pressure into a reaction zone including said catalyst bed, continuously recycling a portion of the effluent comprising polymerized olefins from said bed at substantially reaction temperature into contact with said stream and passing the mixture thereof through said bed whereby substantially no temperature gradient exists between the inlet and outlet of said bed, and continuously withdrawing a portion of said effluent from said reaction zone, said reaction temperature and pressure being sufficiently high to maintain the fluid contents of said zone in a substantially non-gaseous phase and the temperature of said feed stream being sufficiently low whereby its sensible heat up to reaction temperature will balance substantially the exothermic heat evolved during said polymerization reaction.

References Cited in the file of this patent

UNITED STATES PATENTS

| Number | Name | Date |
|---|---|---|
| 2,142,969 | Story | Jan. 3, 1939 |
| 2,198,795 | Titlestad | Apr. 30, 1940 |
| 2,223,268 | Plummer | Nov. 26, 1940 |
| 2,273,038 | Houdry et al. | Feb. 17, 1942 |
| 2,363,738 | Mather et al. | Nov. 28, 1944 |
| 2,384,874 | Barr | Sept. 18, 1945 |
| 2,415,951 | Kirkbride et al. | Feb. 18, 1947 |
| 2,456,338 | Stadtherr | Dec. 14, 1948 |
| 2,470,904 | Shanley | May 24, 1949 |
| 2,500,307 | Brooke et al. | Mar. 14, 1950 |